(12) United States Patent
Choi

(10) Patent No.: US 8,644,504 B2
(45) Date of Patent: Feb. 4, 2014

(54) METHOD, APPARATUS, AND SYSTEM FOR DECIPHERING MEDIA CONTENT STREAM

(75) Inventor: Hoon Choi, Mountain View, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 464 days.

(21) Appl. No.: 12/391,987

(22) Filed: Feb. 24, 2009

(65) Prior Publication Data

US 2009/0219447 A1 Sep. 3, 2009

Related U.S. Application Data

(60) Provisional application No. 61/032,424, filed on Feb. 28, 2008.

(51) Int. Cl.
*H04N 7/167* (2011.01)

(52) U.S. Cl.
USPC .......................................................... 380/210

(58) Field of Classification Search
USPC .......................................................... 380/210
See application file for complete search history.

(56) References Cited

U.S. PATENT DOCUMENTS

| | | | |
|---|---|---|---|
| 6,914,637 B1 * | 7/2005 | Wolf et al. ..................... | 348/473 |
| 7,710,978 B2 * | 5/2010 | Signaoff et al. ............ | 370/395.5 |
| 7,844,762 B2 * | 11/2010 | Banks et al. ..................... | 710/62 |
| 2004/0158873 A1 * | 8/2004 | Pasqualino ..................... | 725/131 |
| 2005/0225547 A1 | 10/2005 | Choi | |
| 2006/0104392 A1 * | 5/2006 | Chung .......................... | 375/342 |
| 2006/0161968 A1 * | 7/2006 | Crombie et al. ................. | 726/2 |
| 2006/0208929 A1 | 9/2006 | Cho | |
| 2007/0150756 A1 * | 6/2007 | Kudelski ....................... | 713/194 |
| 2007/0200859 A1 * | 8/2007 | Banks et al. .................. | 345/520 |
| 2007/0242696 A1 | 10/2007 | Signaoff et al. | |
| 2007/0291938 A1 * | 12/2007 | Rao et al. ...................... | 380/210 |
| 2008/0005310 A1 | 1/2008 | Xu et al. | |
| 2008/0025507 A1 * | 1/2008 | Taylor .......................... | 380/201 |
| 2008/0101467 A1 * | 5/2008 | MacMullan et al. ...... | 375/240.12 |
| 2009/0162032 A1 * | 6/2009 | Patel ............................. | 386/123 |
| 2010/0177786 A1 * | 7/2010 | Signaoff et al. ............... | 370/466 |

FOREIGN PATENT DOCUMENTS

| | | |
|---|---|---|
| CN | 1636342 | 7/2005 |
| EP | 2003/0086503 | 5/2003 |
| EP | 1432192 | 6/2004 |
| EP | 1624669 | 2/2006 |
| EP | 1761053 | 3/2007 |

OTHER PUBLICATIONS

"PCT ISR WO Mailed Apr. 23, 2009 for PCT/US2009/035352", (Apr. 23, 2009), Whole Document.

(Continued)

*Primary Examiner* — Teshome Hailu

(74) *Attorney, Agent, or Firm* — Blakely, Sokoloff, Taylor & Zafman LLP

(57) ABSTRACT

A method, apparatus and system for media content deciphering is disclosed. In one embodiment, a first content stream is received at a receiver device from a transmitter device coupled to the receiver device, wherein the first content stream having media content formatted in a particular package structure, the media content is associated with High-Definition Content Protection (HDCP) values. The first content stream is deciphered into a second content stream by removing the HDCP values from the first content stream, while the package structure of the media content is maintained.

19 Claims, 11 Drawing Sheets

(56) References Cited

OTHER PUBLICATIONS

"PCT International Search Report", PCT/US2009/035353, (Apr. 23, 2009), pp. 1-12.
Communication pursuant to Article 94(3) EPC for European Patent Application No. 09714794.6-2202, Mailed Jul. 27, 2011, 4 pages.

"First Office Action issued for Chinese Patent Application No. 200980107103.5", mailed Mar. 26, 2012. Foreign Associate mailed May 4, 2012., 12 pages.
"High-Bandwidth Digital Content Protection System Revision 1.3", Dec. 21, 2006 *Digital Content Protection, LLC*. pp. 1-90.
Hitachi, Ltd., et al., "High-Definition Multimedia Interface", *Specification Verion 1.1*, May 20, 2004, pp. 1-206.

* cited by examiner

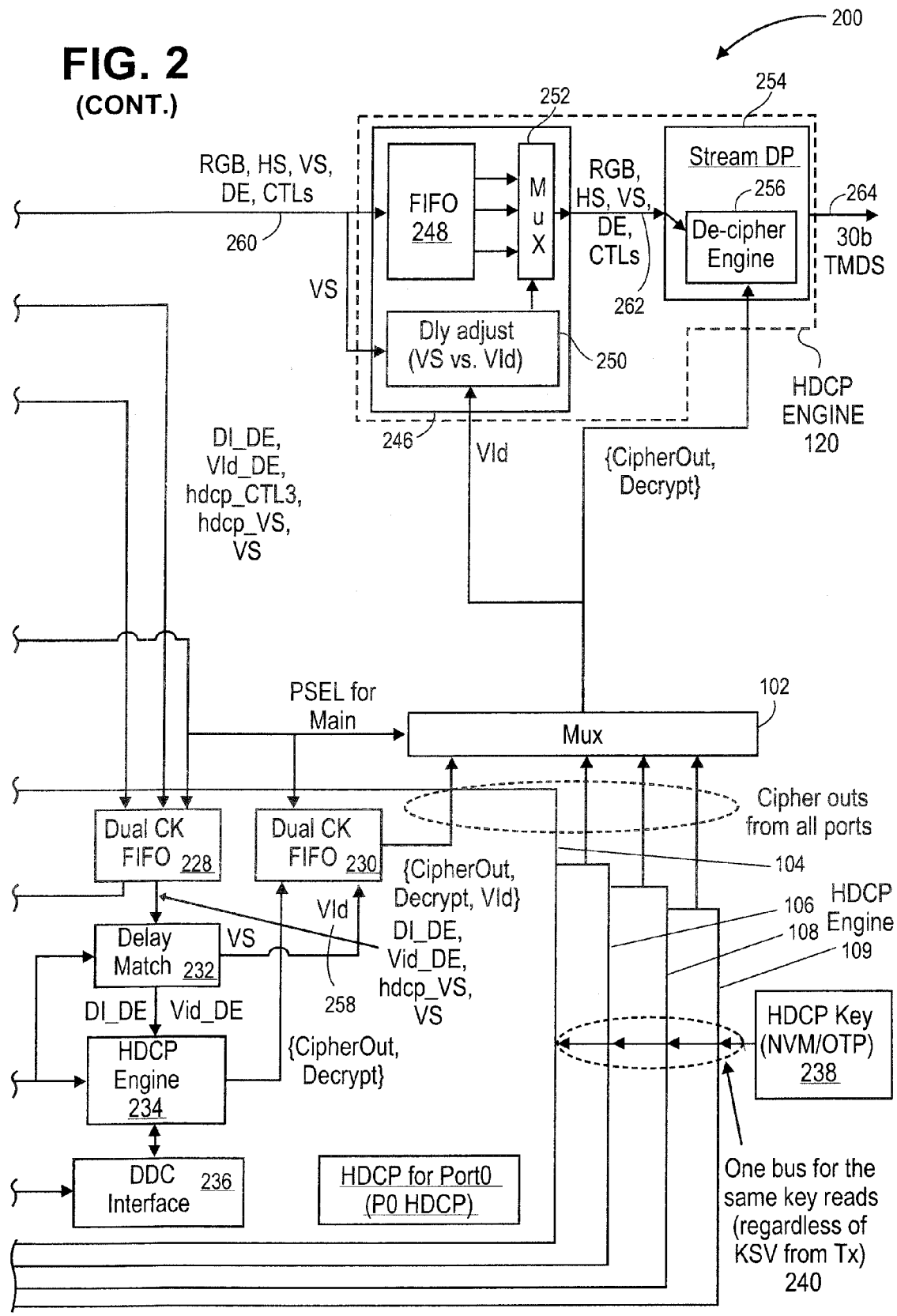

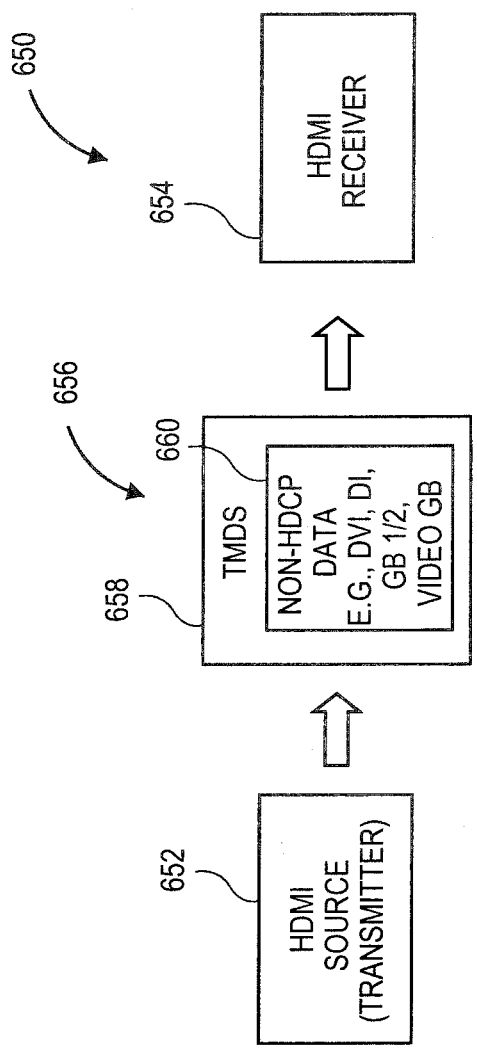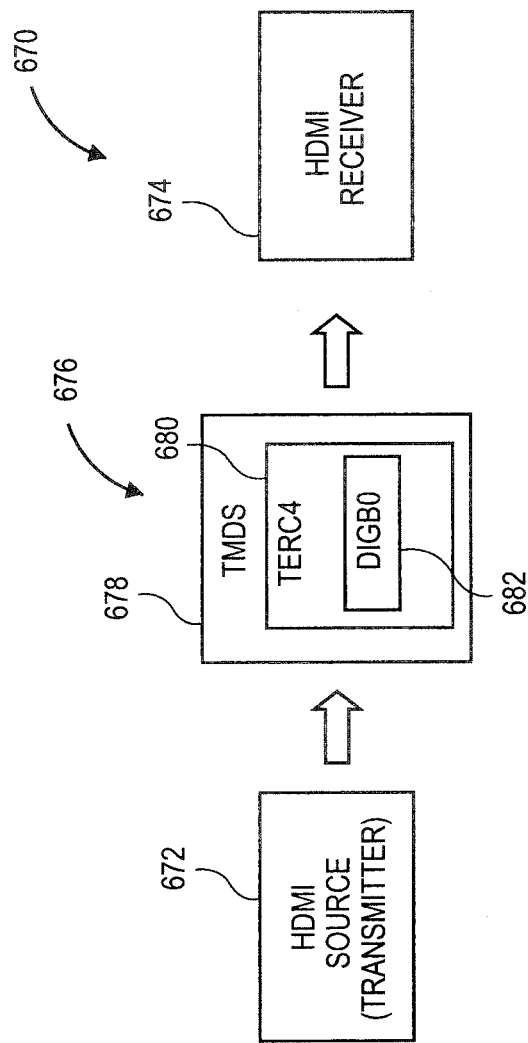

METHOD, APPARATUS, AND SYSTEM FOR DECIPHERING MEDIA CONTENT STREAM

RELATED APPLICATION

This patent application claims priority to a provisional U.S. patent application No. 61/032,424, filed Feb. 28, 2008.

FIELD

Embodiments of the invention generally relate to the field of networks and, more particularly, to deciphering of media content streams.

BACKGROUND

In the operation of a system that utilizes multiple data streams, such as multiple media data streams for display. The data may include data protected by High-bandwidth Digital Content Protection (HDCP) data, which is referred to herein as HDCP data.

HDCP is a content protection protocol that is used to protect media content, particularly premium media content. For example, when there is flow of content between transmitting device (e.g., a DVD player) and a receiving device (e.g., a television) via a High-Definition Multimedia Interface (HDMI) interface. When premium HDMI media content flowing between devices includes HDCP values, a system may provide multiple encoded streams that use deciphering. However, the process of deciphering HDMI content streams is time consuming and cumbersome and wastes valuable system resources. This generally results in a delay before the data may be viewed or heard, thereby interfering with the use and enjoyment of a system.

The conventional techniques when deciphering an HDMI media content stream to remove HDCP values (which the receiver is not to receive) require the entire content stream to be disassembled, i.e., removing video content, audio content, etc., only then to reassemble the media content stream. These conventional techniques not only force the media stream to lose its format, but also require extra hardware to perform the deciphering task that burdens the system resources.

It is, therefore, desirable to have a deciphering system that provides for efficient deciphering of a media content stream, such as in a manner that removes certain values while retaining the packet format of the content stream as well as its other content.

SUMMARY

A method, apparatus, and system provides for a deciphering mechanism for deciphering media content streams.

In one embodiment, a method for deciphering media content streams includes receiving a first content stream at a receiver device from a transmitter device coupled to the receiver device, the first content stream having media content formatted in a particular package structure, the media content is associated with High-Definition Content Protection (HDCP) values, deciphering the first content stream into a second content stream by removing the HDCP values from the first content stream, and maintaining the package structure of the media content.

In one embodiment, an apparatus for deciphering media content streams includes a transmitter device to transmit a first content stream to a receiver device, the first content stream having media content formatted in a particular package structure, the media content is associated with High-Definition Content Protection (HDCP) values. The apparatus further includes the receiver having a content deciphering apparatus to decipher the first content stream into a second content stream by removing the HDCP values from the first content stream, and maintaining the package structure of the media content.

In one embodiment, a system for media content deciphering includes a content communication system having a transmitter device coupled to a receiver device having a content deciphering mechanism, the content deciphering mechanism to: receive a first content stream from a transmitter device, the first content stream having media content formatted in a particular package structure, the media content is associated with High-Definition Content Protection (HDCP) values; decipher the first content stream into a second content stream by removing the HDCP values from the first content stream, and maintaining the package structure of the media content.

BRIEF DESCRIPTION OF THE DRAWINGS

Embodiments of the invention are illustrated by way of example, and not by way of limitation, in the figures of the accompanying drawings in which like reference numerals refer to similar elements:

FIG. 6B illustrates an embodiment of processing non-video content associated with a video media content stream;

FIG. 6C illustrates an embodiment of processing non-audio content associated with an audio media content stream.

DETAILED DESCRIPTION

Figure 1:
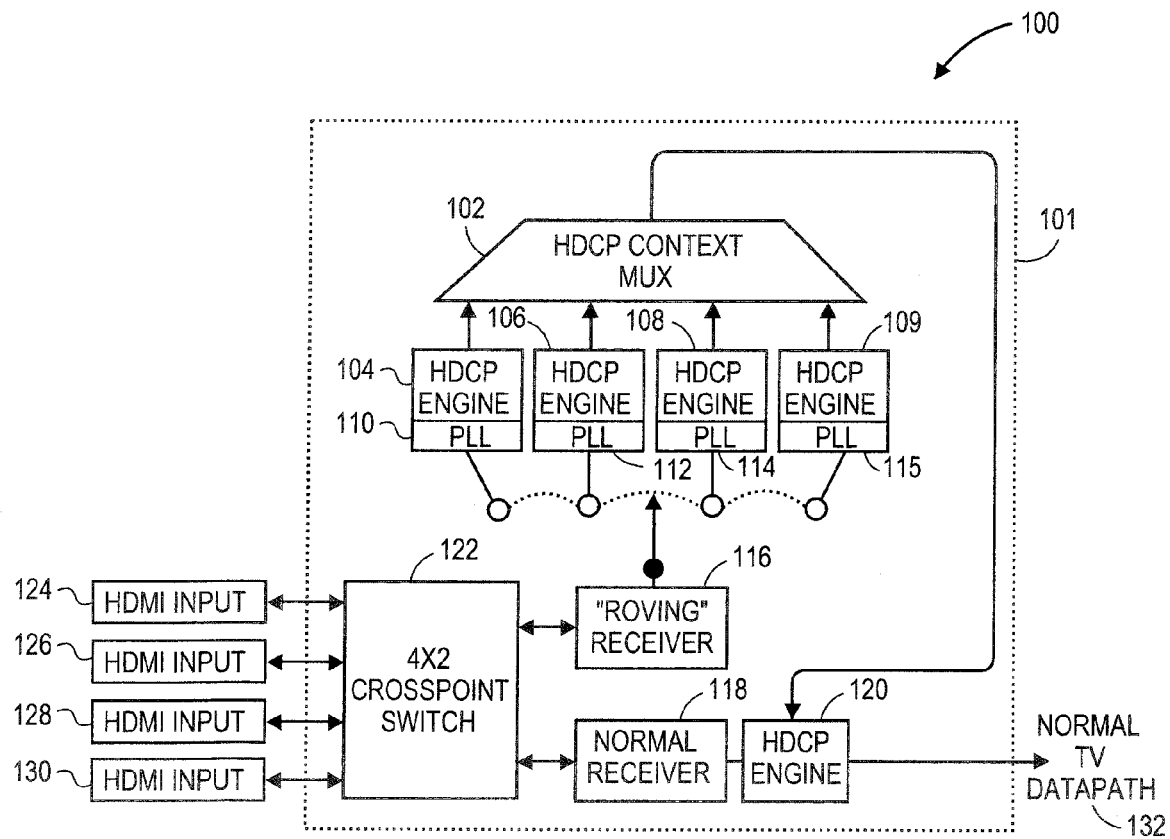
FIG. 1 illustrates an embodiment of a pre-authentication system employing a mechanism for deciphering media content stream.

Embodiments of the invention are generally directed to deciphering media content streams.

As used herein, "network" or "communication network" mean an interconnection network to deliver digital media content (including music, audio/video, gaming, photos, and others) between devices using any number of technologies, such as SATA, Frame Information Structure (FIS), etc. An entertainment network may include a personal entertainment network, such as a network in a household, a network in a business setting, or any other network of devices and/or components. A network includes a Local Area Network (LAN), Wide Area Network (WAN), Metropolitan Area Network (MAN), intranet, the Internet, etc. In a network, certain network devices may be a source of media content, such as a digital television tuner, cable set-top box, handheld device (e.g., personal device assistant (PDA)), video storage server, and other source device. Other devices may display or use media content, such as a digital television, home theater system, audio system, gaming system, and other devices. Further, certain devices may be intended to store or transfer media content, such as video and audio storage servers. Certain devices may perform multiple media functions, such as s cable set-top box can serve as a receiver (receiving information from a cable head-end) as well as a transmitter (transmitting information to a TV) and vice versa. In some embodiments, the network devices may be co-located on a single local area network. In other embodiments, the network devices may span multiple network segments, such as through tunneling between local area networks. A network may also include multiple data encoding and encryption processes as well as identify verification processes, such as unique signature verification and unique ID comparison according to one embodiment.

As used herein, "Tx" will be used to generally refer to a transmitting device such as an HDCP transmitting device and "Rx" will be used to generally refer to a receiving device such as an HDCP receiving device.

A time-based roving HDCP architecture uses two pipes: main pipe and roving pipe. The main pipe is dedicated to a port selected by a user to view contents. The roving pipe roves other ports (background ports) one by one in a time-based fashion, keeping those ports authenticated and synchronized with the corresponding Txs. An implementation allows four ports to be supported with two pipes, for example.

A main pipe (also referred to as main path) in a time-based roving HDCP architecture is a pipe dedicated to the port that a user selects to view content (such as movie). The pipe, in general, is composed of analog PLL, SerDes (Serializer and Deserializer) and other logics to recover the AV data from the incoming bit stream.

A roving pipe (also referred to as roving path) is the pipe that sequentially roves through the ports that are not connected to the main pipe. The components of the roving pipe are the same as the main pipe.

An HDCP engine is the logic block that encrypts or decrypts the media contents. Tx has an encryption engine, while Rx has a decryption engine. The HDCP engine takes care of authentication to establish a secure link between Tx and Rx, also keeping track of synchronization between Tx and Rx over the secure link. To check the synchronization, Tx checks Rx with the Ri value at every 128 frames. The Ri value is a residue value of a shared key between Tx and Rx that is updated at every frame. Further, a cipher/de-cipher engine within a HDCP engine is used to perform ciphering and deciphering of an HDCP content stream.

A CTL3 signal is an indicator saying if the current frame is encrypted frame or not. Tx sends a CTL3 for each frame it has encrypted to let Rx know that it is an encrypted frame. There are other ways to do this in the HDCP specification, and CTL3 is just an example of a possible signaling for the ease of explanation. For purposes of this application, CTL3 shall be interpreted to mean any encryption synchronization signal, including but not limited to a CTL3 signal.

An HDCP signal includes the following: VS (Vertical Sync) and CTL3 (encryption indicator) are in the incoming AV stream for synchronization, while authentication and Ri checking are done thru I2C (DDC) bus.

In one embodiment, a technique is provided for deciphering of HDCP media content streams in a manner that retains the packet format of certain data in the media streams. In some embodiments, data paths for deciphering of media content are provided with pre-authentication processes, but embodiments may be provided in other operations as well In deciphering of content streams in content protection schemes, various tools (e.g., roving receiver) are used to detect, verify, and authenticate devices that communicate with each other. These devices include media devices, such a digital versatile disk or digital video disk (DVD) players, compact disk (CD) players, TVs, computers, etc. For example, a transmitting device (e.g., a DVD player) can use such tools to authenticate a receiving device (e.g., TV) to determine whether the receiving device is legal or eligible to receive premium protected media content from the transmitting device. Similarly, the receiving device authenticates the transmitting device prior to accepting the protected media content from it. To avoid too many of such authentication processes (that can be cumbersome, time consuming, and resource wasting), pre-authentication of devices is performed.

"Pre-Authentication" is a term used here to indicate a feature of devices, including HDMI switch products, to allow them to switch more quickly between inputs. The term describes the performance of necessary HDCP authentication before switching to the input, instead of after switching. In this way, the significant delays associated with authentication may be hidden in the background of operation, instead of the foreground.

Since HDCP receivers are considered slave devices, an HDCP receiver is not expected to explicitly signal a transmitter with any request or status. Even a "broken" link is typically signaled implicitly (and rather crudely) by intentionally "breaking" the Ri sequence (the response from Rx to Tx when Tx checks if the link is kept being synchronized securely). There are a wide variety of HDCP transmitters. Many of these HDCP transmitters exhibit unique and quirky behavior that causes much of the delay in media content communication. Embodiments of deciphering of media content streams, as described throughout this document, are employed to address such issues and to provide significant value in data stream operations.

In one embodiment, each input (e.g., HDMI input) that undergoes deciphering may have its own HDCP engine that stays synchronized to the source. This means any normal and correct Ri link integrity results are provided to the transmitter so it is ready to properly decrypt if and when the user switches to this input. For example, one of the following three ways may be employed to accomplish this: (1) each link having a complete Transition Minimized Differential Signaling (TMDS) receiver that keeps the corresponding HDCP block synchronized; (2) each link having a partial TMDS receiver that keeps the corresponding HDCP block synchronized; and (3) each link keeping the corresponding HDCP block synchronized in an open-loop fashion without the constant or direct observation of the video link itself.

With regard to HDCP synchronization; in general, an HDCP receiver needs two things to stay synchronized with the transmitter: (1) the receiver knows where the frame boundaries are; and (2) the receiver knows which of these frames contains a signal that indicates that a frame is encrypted (e.g., CTL3). Throughout this document, "CTL3" is used as an example of encryption indicator without any limitation for the ease of explanation, brevity, and clarity.

In one embodiment, some of the components of a pre-authentication system or apparatus that is used to decipher HDCP media content streams, such as the one described in FIG. 1 and subsequent figures, includes: HDCP engines, Phase Lock Loop (PLL), a roving receiver, a normal receiver, etc.

In some embodiments, an apparatus contains one dedicated HDCP engine per input port. In general, normal HDCP logic is typically employed in every case, even when the open-loop HDCP engines do not do any decryption. This is because the re-keying functions use the HDCP logic to maximize dispersion.

Each open-loop HDCP engine uses a PLL or PLL-like circuit to lock onto the frame rate and provide ongoing information about where the frame boundaries are while running in the open-loop mode. The PLL could be either an analog or digital PLL. However, a digital PLL is simple and locks quickly, and provides good long term stability.

A single special purpose TMDS receiver is used to sequentially provide the essential information to the open-loop logic. This receiver cycles through the currently unused inputs, finds the frame boundaries (so that the corresponding PLL can lock on), and also finds the first CTL3 signal when an authentication occurs. This could be a stripped-down version of a TMDS receiver because, in essence, merely the VSYNC and CTL3 indicators are used.

A normal TV data path may work in the same manner as conventional switch products. In operation, one of the input ports is selected for the normal data path, the data stream is decoded and decrypted as necessary, and then is routed through the remainder of the appliance. Further, the roving receiver samples the currently idle ports, one at a time. This employs a state machine or (more likely) a microcontroller of some kind to control it all.

The foregoing discussion further includes HDCP context switching that relates to a system and procedure for initializing and then and keeping the open-loop HDCP engines synchronized. In some embodiment, a switch is produced to provide for such operations.

In one embodiment, a system is provided for deciphering of HDMI media content streams in a manner that retains the packet format of certain data of the content streams. In some embodiments, data paths for deciphering of such content streams are provided in associated with pre-authentication processes for ports, but embodiments may be provided in other operations as well.

In some embodiments, rather than tearing down a content stream in deciphering and then building the stream back up for transfer, which can be time and resource consuming, a data path is provided that allows for retention of packet format, thus increasing the efficiency of operation.

In another embodiment of deciphering and transferring media content, rather than breaking down a content stream down to audio content and building the content back up into a content stream, a process is provided to include maintaining a content stream, and leaving the audio content in the form of packets.

In one embodiment, cipher information is removed from data packets while retaining the packet format in an HDMI content stream. In a particular example, a content stream may include an audio packet that, indication to HDCP encoding, includes additional encoding. In an example, audio data may include Transition-Minimized Differential Signaling Error Reduction Coding-4 (TERC4) or related encoding.

Data flows for deciphering are described throughout this document and illustrated in subsequent figures, as indicated below.

FIG. 1 illustrates an embodiment of a pre-authentication system 100 employing a mechanism 120 for deciphering media content stream. The illustrated HDCP pre-authentication system 100 includes an HDCP (pre-authenticated) device 101 that include a dedicated HDCP engine block 104-109, 120 per input port. In general, the normal HDCP logic is used in every case, even when the open-loop ciphers do not do any decryption. This is because the re-keying functions use the HDCP logic to maximize dispersion. Further, an open-loop HDCP engine 104-109 is associated with a PLL 110-115 or PLL-like circuit to lock onto the frame rate and provide ongoing information about where the frame boundaries are while running in the open-loop mode.

A single special purpose Transition Minimized Differential Signaling (TMDS) receiver 116 (e.g., roving receiver) may be used to sequentially provide the essential information to the open-loop logic. This roving receiver 116 cycles through the currently unused inputs, finds the frame boundaries (so that the corresponding PLL 110-115 can lock on), and also finds the first CTL3 signal when an authentication occurs. In some cases, this could be a stripped-down version of a TMDS receiver 116 because in essence, it merely needs the VSYNC and CTL3 indicators.

Further, a normal TV data path 132 may work in the same manner as conventional switch products. In operation, one of the input ports can be selected for the normal data path 132, while the data stream is decoded and decrypted (e.g., decipher to take out original audio/video (A/V) data from the incoming encrypted data) as necessary, and then is routed through the remainder of the appliance.

The roving receiver 116 samples the currently idle ports, one at a time. This necessitates a state-machine or (more likely) a microcontroller of some kind to control the process. The initial operational sequence typically follows: (1) the roving receiver 116 is connected to an unused input port and monitors it for video; (2) the HDCP engine 104-109 is connected to the port as well, which means that the I²C bus is connected (e.g., I²C is regarded as an additional communication channel between Tx and Rx for link synchronization check). It may also mean signaling hotplug, to indicate to the source that it is ready for getting transmission and the HDCP authentication. This may also facilitate the transfer of Extended Display Identification Data (EDID) information, but this is beyond the scope of this disclosure; (3) when video is stable, the roving receiver 116 provides information to align the PLL with the frame boundaries; (4) the state machine or microcontroller waits a time period for the HDCP authentication to begin. If it does, it continues to wait until the authentication completes and the first CTL3 signal is received; (5) the HDCP block continues to cycle in an open-loop function counting "frames" using information only from the PLL. The I²C port stays connected, and the hotplug signal continues to indicate that a receiver is connected; (6) the roving receiver 116 then continues on to the next port and performs the same operations. In some embodiments, once the roving receiver 116 has started all ports, it then goes into a service loop, checking each port in sequence.

Figure 2:
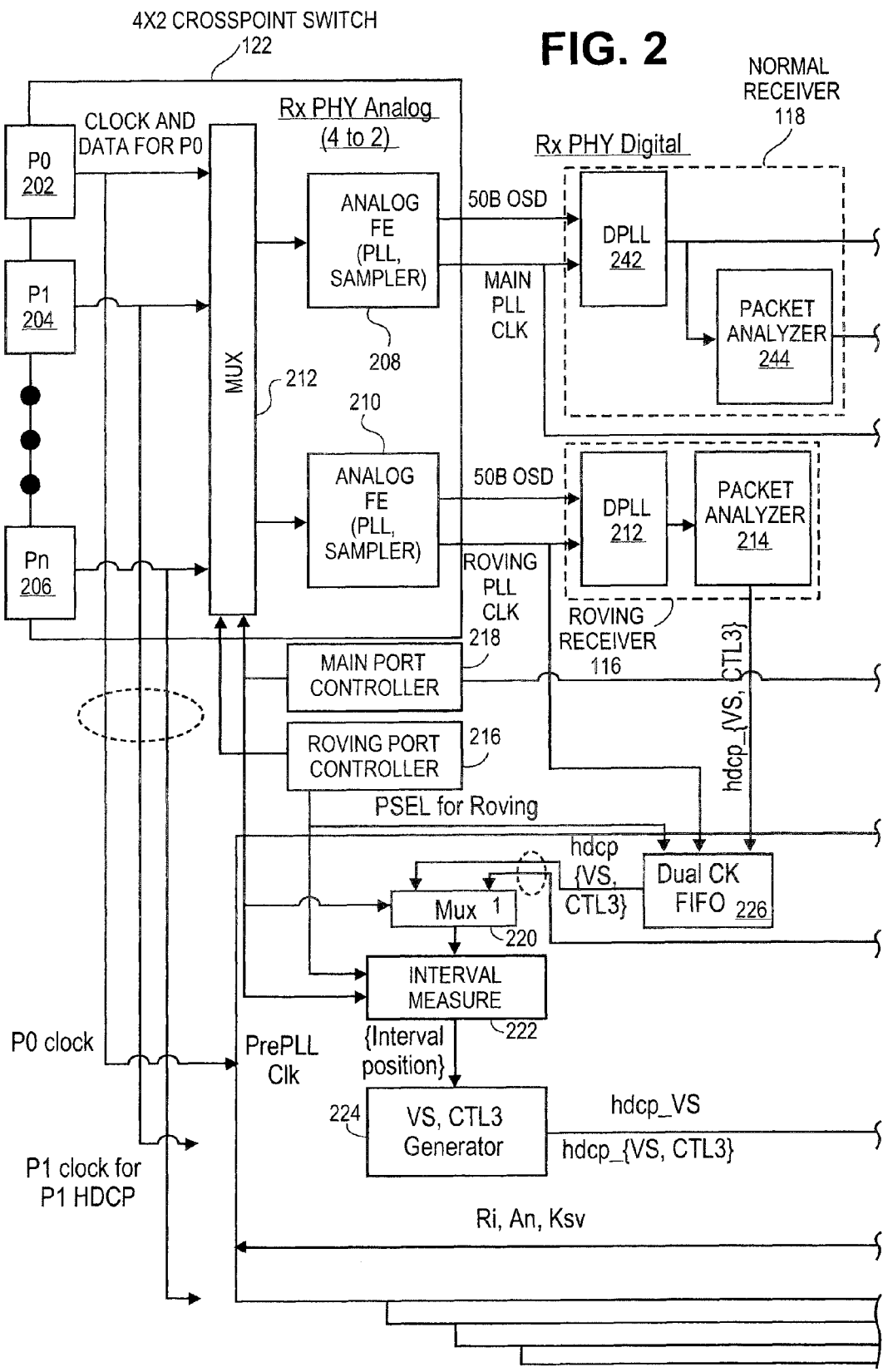
FIG. 2 illustrates an embodiment of a pre-authentication architecture providing a zoom-in of various components of the pre-authentication system of FIG. 1 including an embodiment of a media content deciphering mechanism.

In one embodiment, a pre-authentication system 100 having a pre-authentication device 101 of FIG. 1 employing a pre-authentication architecture (as shown in FIG. 2) and further an embodiment of a content deciphering mechanism of FIGS. 3-6B may reside in a receiver chip (e.g., switch chip) of a receiver, Rx. Such a receiver can be, for example, used in digital televisions for better and efficient reception of media content.

HDCP engine 120, as illustrated in FIG. 2, employs an embodiment of a mechanism for deciphering media content streams while preserving certain data of a content stream and without breaking down the entire content stream.

FIG. 2 illustrates an embodiment of a pre-authentication architecture 200 providing a zoom-in of various components of the pre-authentication system 100 of FIG. 1 including an embodiment of a media content deciphering mechanism 120. For example, FIG. 1's crosspoint switch (4×2) 122 is shown has having analog receivers (e.g., Rx PHY analog) 208, 210 that are coupled with a multiplexer 212 further coupled with a number of ports, such as port 0 202, port 1 204 continuing with port n 206 (that correspond to HDMI inputs 124-130 of FIG. 1). The illustrated embodiment further shows normal receiver 118 having DPLL 242 and packet analyzer 244. Similarly, rover receiver 116 is illustrated as comprising DPLL 212 and packet analyzer 214.

Further, HDCP engines 104-109 are illustrated here being coupled thru HDCP context multiplexer 102. Each HDCP engine having or coupled with various sub-components, such as HDCP engine 104 shown as having or coupled with HDCP key 238 as well as multiplexer 220, interval measure 222, video signal (VS) and CTL3 generator 224, dual CK FIFO 226, dual CK FIFO 228, dual CK FIFO 230, delay match 232, HDCP engine 234, and DDC interface 236. In one embodiment, HDCP engine 104 is represented as HDCP engine 234 coupled with various components 220-238.

An embodiment of a mechanism for deciphering media content stream (e.g., HDMI media content stream), illustrated as HDCP engine 120 in FIG. 1, is shown here as having component 246 (including First-In-First-Out (FIFO) 248, Delay adjustment module 250, and multiplexer 252) and stream DP 254 having de-cipher engine 256. The mechanism 120 and its deciphering functionalities are further described and illustrated in the subsequent figures.

In one embodiment, a mechanism to perform deciphering of media content streams is provided that rather than tearing down a content stream in deciphering and then building the content stream back up for transfer, provides a novel data path that allows for retention of certain packet format and content, thus increasing the efficiency of operation. In one embodiment of deciphering and transferring media content, rather than breaking a data stream down to audio content and building the data back up into a content stream, a process includes maintaining the content stream, and leaving audio content in the form of packets.

For example, a media content stream 260 (e.g., RGB, HS, VS, DE, CTL, etc.) is received at component 246 to go through FIFO 248 and delay adjustment 250 and finally through multiplexer 252. A refined content stream 262 then leaves component 246 and reaches content stream deciphering unit 254. In one embodiment, at content deciphering unit 254, via decipher engine 256, the content stream is deciphered (e.g., decrypted) in such a manner that only the HDCP information layer is removed from the content stream while preserving the rest of the data turning the content stream 262 into a newly deciphered content stream 264 (e.g., TMDS encoded content stream). This novel deciphering technique is clearly different from conventional techniques that require the entire content stream to be disassembled (losing the content stream format by removing video and audio layers, etc.) only to be reassembled again. These conventional techniques not only make the deciphering operation slow and wasteful of system resources, but also require expensive and complex hardware to perform disassembling and reassembling of content media streams.

Figure 3:
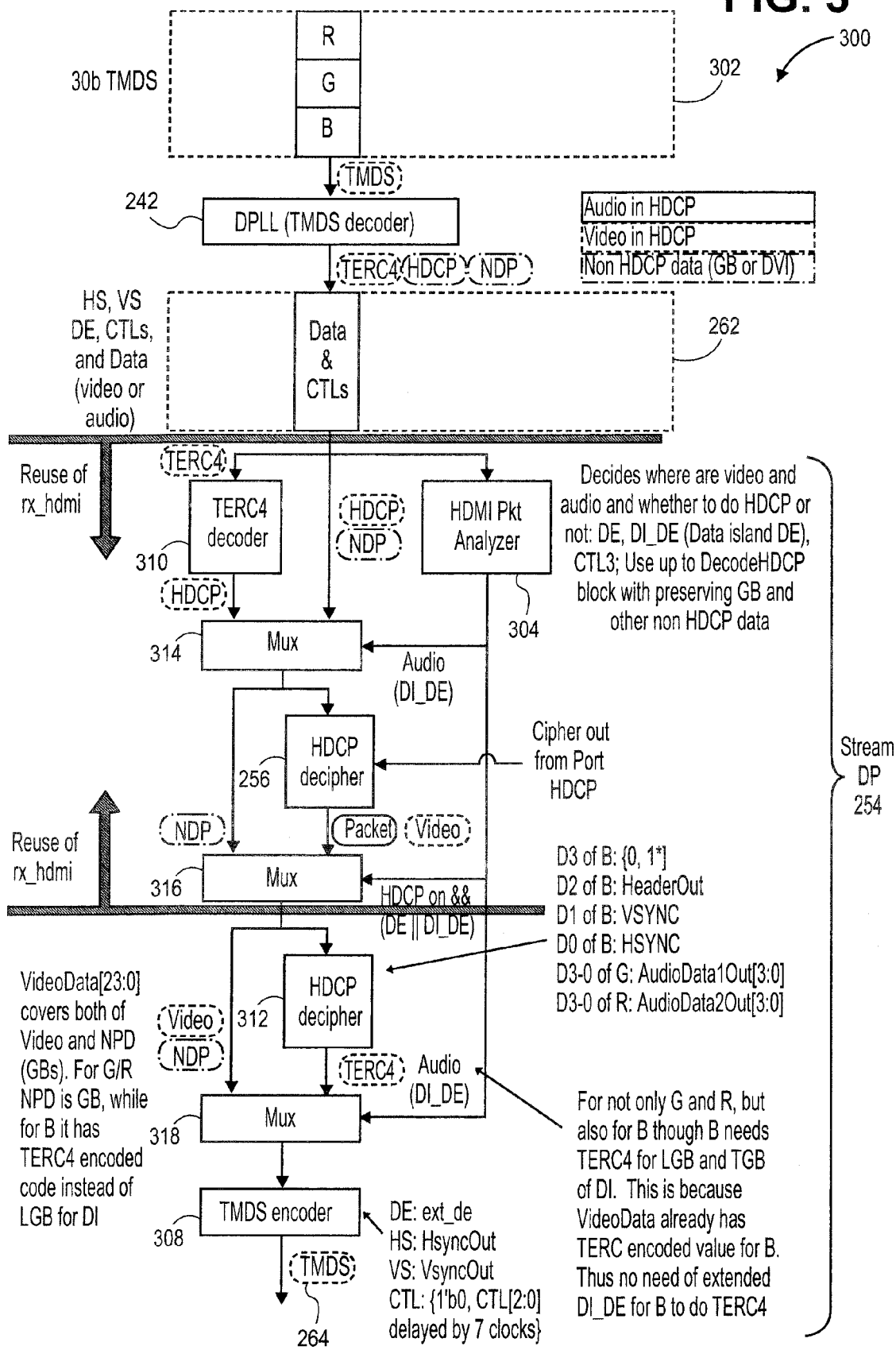
FIG. 3 illustrates an embodiment of a media content stream deciphering mechanism and its deciphering processes.

FIG. 3 illustrates an embodiment of a media content stream deciphering mechanism 300 and its deciphering processes. An encoded media content stream, such as an HMDI content stream, is received from an HDMI source or transmitter. This HDMI content stream includes HDCP values in additional to other data (e.g., audio content, video content, non-audio/video content, etc.). In one embodiment, the HDMI content stream is deciphered such that the audio, video content and other necessary content are protected in their form, while the HDCP values are removed from the stream. This technique is further described in the illustrated embodiment.

An encoded HDMI media content stream (e.g., 30b TMDS) 302 is received at DPLL (e.g., TDMS decoder) 242 of FIG. 2 where the content stream's TDMS layer or shell is decoded or removed. Once the TDMS layer is removed, the content stream 262 (e.g., HD, VS, DE, CTLs, and content of video and/or audio) of FIG. 2 now enters the stream DP component 254 of FIG. 2. Layers like TDMS (added to video and audio contents and as well as non-audio/video contents) and TERC4 (added to audio content and some non-audio/video contents) are part of a content stream to not only protect the underlying media content, but also to provide an appropriate flow of the stream through physical wires.

Once the content stream 262 enters, HMDI packet analyzer 304 determines whether the content stream includes audio content or video content. If the entering content stream 262 merely includes video content, it bypasses TERC4 decoder 310 and is, instead, sent to HDCP decipher engine 256, also illustrated in FIG. 2, via multiplexer 314, to decipher the video content stream by removing the HDCP layer (values) from the content stream, but without disassembling the video content and leaving it in its proper and original format. Further, the reason the video stream bypasses TERC4 decoder 310 is because the video stream does not include a TERC layer and therefore, there is no need for a video stream to go through TERC decoding.

After the removal of the HDCP values from the video stream, it then passes through multiplexer 316 and multiplexer 318, bypassing TERC4 encoder 312, to TMDS encoder 308 so that the TMDS layer can be reassigned to (or re-encoded on to) the video content of the stream that is now without the HDCP layer. A new deciphered media content steam 264 (as shown in FIG. 2) is then provided to a receiver for the user's enjoyment of HDMI media content.

In one embodiment, using the novel media content deciphering technique, a video HDMI media content stream is deciphered such that any HDCP values are removed, the TMDS layer is removed and then reassigned, while all other contents (including video and non-video contents) are retained in their original format.

In one embodiment, if the entering media content stream 262 includes audio content, as determined by HDMI packet analyzer 304, the content stream 262 is sent to TERC4 decoder 310 to help remove the TERC4 layer that is used in audio media streams to ensure proper flow of the audio stream through wires and to provide protection of the audio content. Once the TERC4 layer is removed, the next layer in the stream is the HDCP layer and thus, the content stream is then sent to HDCP decipher engine 256, via multiplexer 314, to remove the HDCP layer. Once the HDCP layer (values) is removed, the audio content stream is sent to TERC4 encoder 312, via multiplexer 316, so that the TERC4 layer that was previously removed can be re-assigned or re-encoded to the audio packet now without the HDCP values. After re-encoding the TERC4 layer to the audio packet, the audio content stream is then sent to TMDS encoder 308, via multiplexer 318, so that the TMDS layer can be re-assigned over the TERC4 layer of the audio packet. This completes the deciphered audio content stream and it is sent out as a TDMS-encoded HDMI content stream 264 to a receiver to be broadcasted for the user's enjoyment.

In one embodiment, using the novel media content deciphering technique, an audio HDMI media content stream is deciphered such that any HDCP values are removed, the TMDS and TERC4 layers are removed and then reassigned, while all other contents (including audio content packet and non-audio contents) are retained in their original format. Unlike video contents, audio contents are packaged into an audio packet.

Figure 4A:
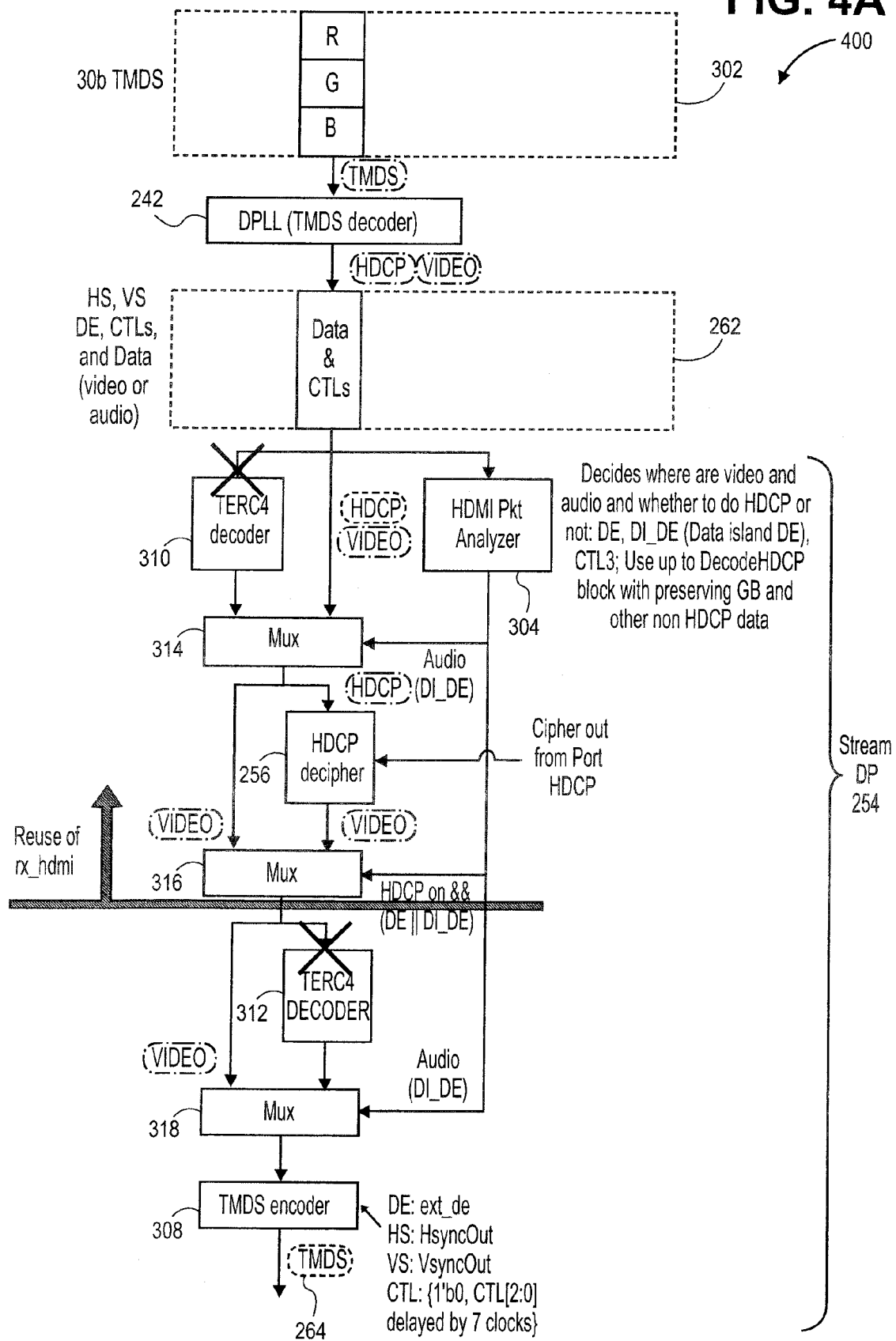
FIG. 4A illustrates an embodiment of a media content stream deciphering mechanism deciphering a video media content stream.

FIG. 4A illustrates an embodiment of a media content stream deciphering mechanism 400 deciphering a video media content stream. For brevity and clarity, any details already described with reference to FIG. 3 are incorporated here, but not re-stated. If HDMI packet analyzer 304 determines a media content stream 262 as having video content, TERC4 decoder 310 and TERC4 encoder 308 are bypassed since a video media content stream is built without a TERC4 layer. Nevertheless, in one embodiment, the HDCP layer is removed from the stream and the TMDS layer is removed and put back, and the video media content stream 264 is sent to an HDMI receiver for viewing.

Figure 4B:
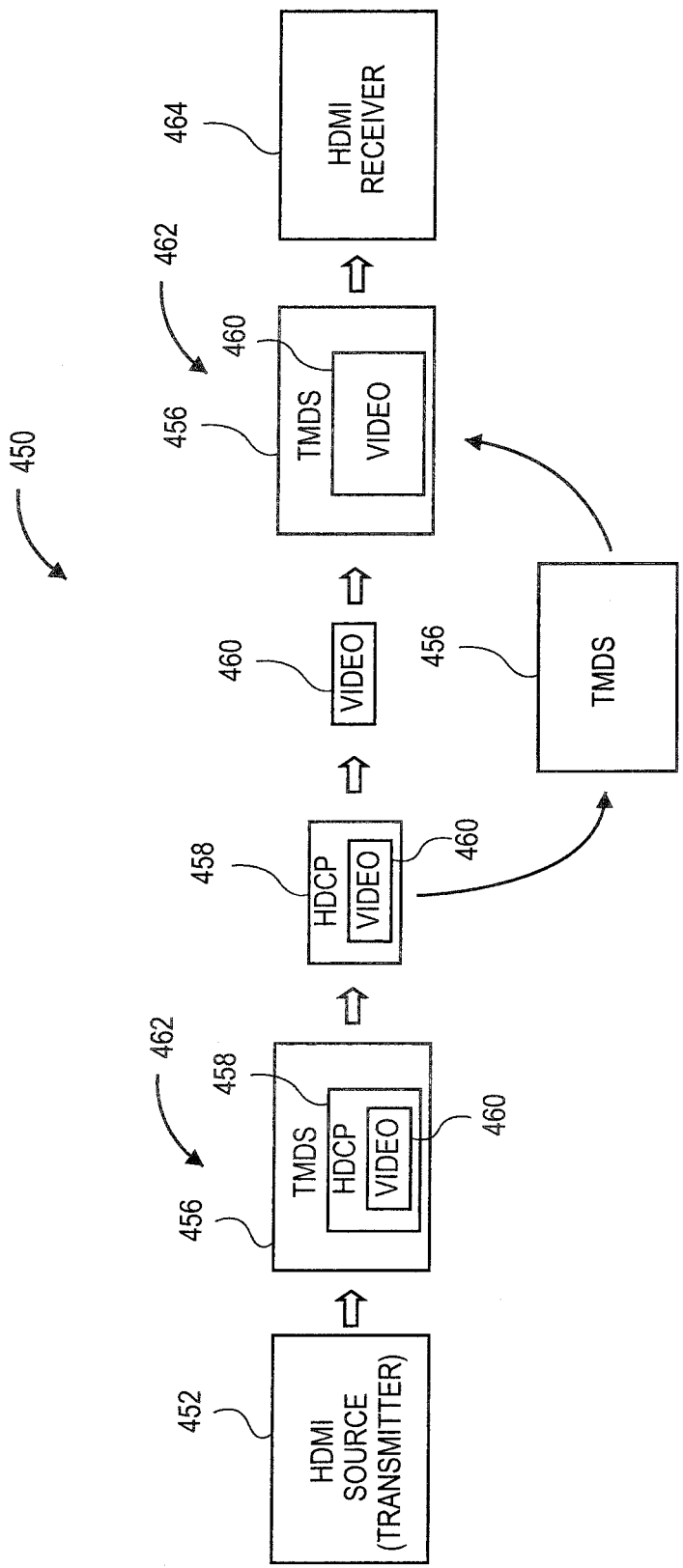
FIG. 4B illustrates an embodiment of a process for deciphering a video media content stream.

FIG. 4B illustrates an embodiment of a process 450 for deciphering a video media content stream. An HDMI video content stream 454 is received from an HDMI source 452 (e.g., HDMI content transmitter). The HDMI video content stream 454 contains video content 460, an HDCP layer 458 of HDCP values, and a TMDS layer 456. The TMDS layer is removed using a TMDS decoder, leaving the video content 460 and the HDCP layer 458. The HDCP layer 458 is then removed using an HDCP decipher engine, still leaving the video content 460 intact in its original format. Using a TMDS encoder, the TMDS layer 456 is encoded back on the video content 460 and a new video media content stream 462 is broadcasted by an HDMI receiver 464. In one embodiment, the deciphering mechanism or apparatus is part of the HDMI receiver 464 and thus, it is contemplated that the deciphering process 450 takes place at the HDMI receiver 464 as performed by the deciphering mechanism or apparatus (of HDMI receiver 464).

Figure 5A:
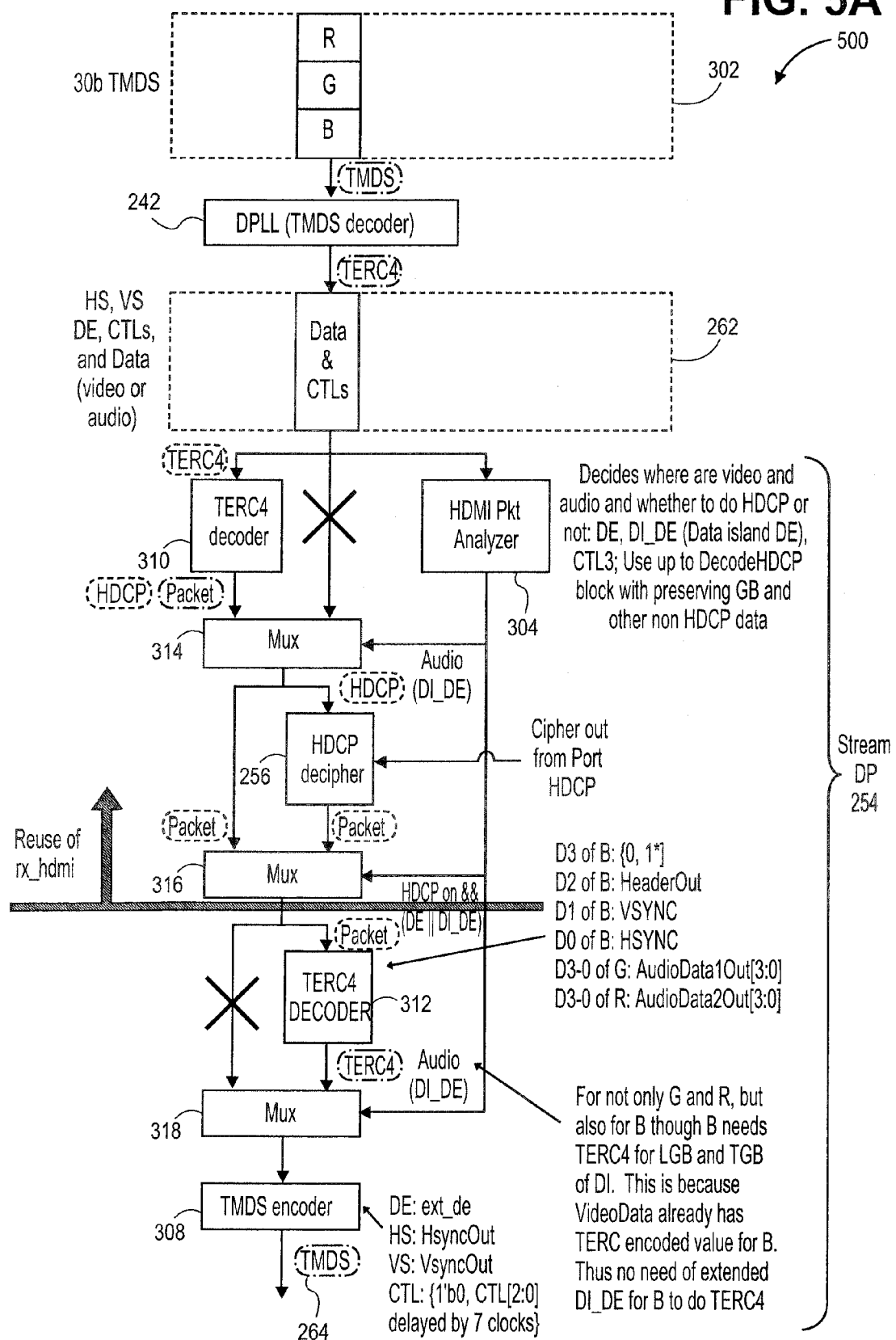
FIG. 5A illustrates an embodiment of a media content stream deciphering mechanism 400 deciphering an audio media content stream.

FIG. 5A illustrates an embodiment of a media content stream deciphering mechanism 500 deciphering a video media content stream. For brevity and clarity, any details already described with reference to FIG. 3 are incorporated here, but not re-stated. If HDMI packet analyzer 304 determines a media content stream 262 as having audio content, TERC4 decoder 310 and TERC4 encoder 308 are not bypassed since an audio media content stream is built with a TERC4 layer. Hence, in one embodiment, the TMDS and TERC4 layers are temporarily removed from the content stream. Then, the HDCP layer having HDCP values is removed from the content stream and the TMDS and TERC4 layers are encoded back on the audio packet to develop a new audio media content stream 264 that is then sent to an HDMI receiver for broadcast. In one embodiment, the audio packet is preserved in its original format during the deciphering process.

Figure 5B:
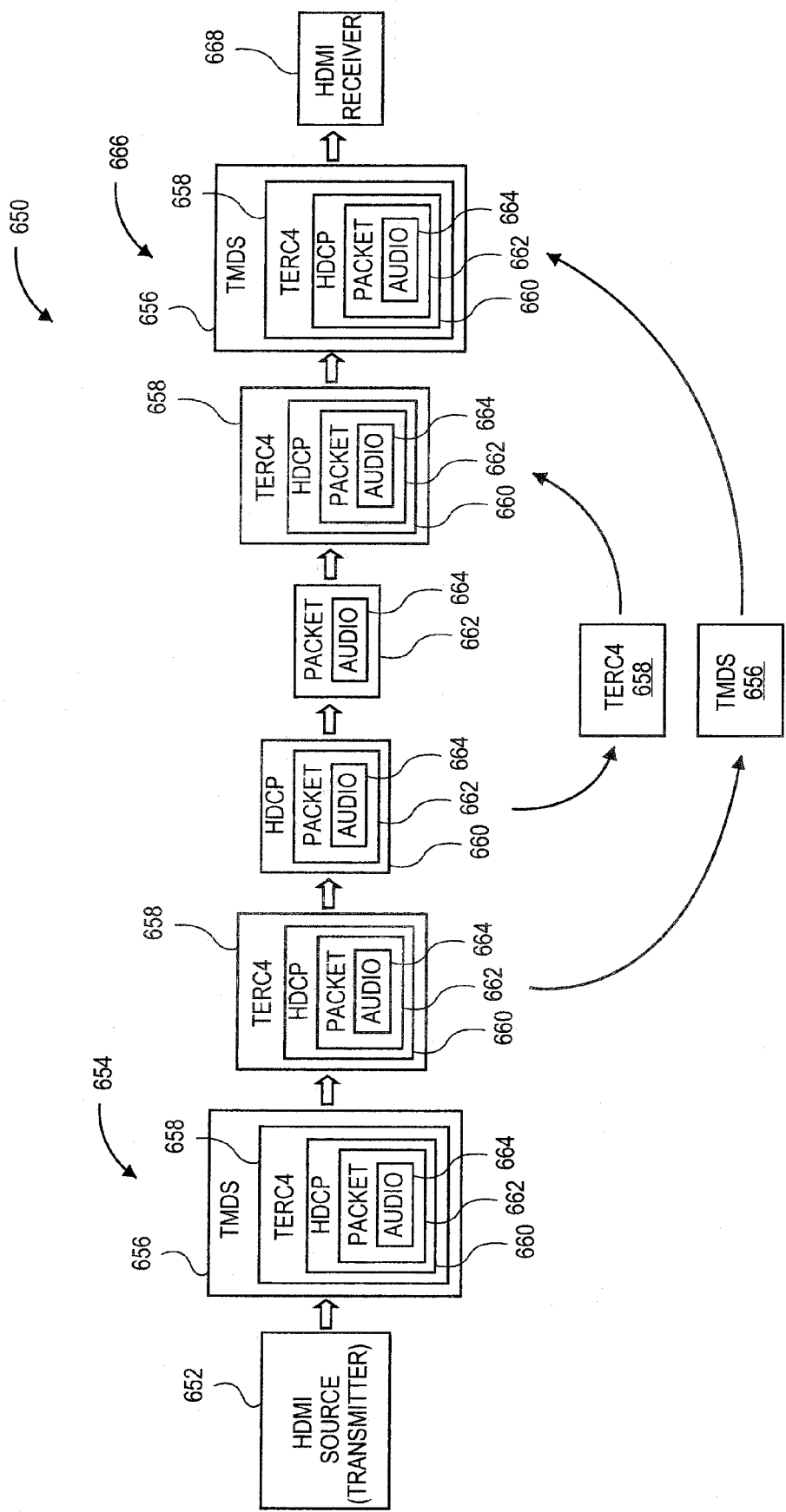
FIG. 5B illustrates an embodiment of a process for deciphering an audio media content stream.

FIG. 5B illustrates an embodiment of a process 650 for deciphering an audio media content stream. An HDMI audio content stream 654 is received from an HDMI source 652 (e.g., HDMI content transmitter). The HDMI audio content stream 654 contains audio content 664, audio content packet 662, an HDCP layer 660 of HDCP values, a TERC4 layer 658, a TMDS layer 656. The TMDS layer 656 is removed using a TMDS decoder, and the TERC4 layer 658 is removed using a decoder, leaving the audio content 664 and its packet 662 alone with the HDCP layer 660. The HDCP layer 660 is then removed using an HDCP decipher engine, but leaving the audio content 664 in its original format and packet 662. Using a TMDS encoder and TERC4 encoder, the TMDS layer 656 and the TERC4 layer 658, respectively, are encoded back on the audio packet 662. This provides a new TMDS- and TERC4-encoded audio media content stream 666 is broadcasted by an HDMI receiver 668. In one embodiment, the deciphering mechanism or apparatus is part of the HDMI receiver 668 and thus, it is contemplated that the deciphering process 650 takes place at the HDMI receiver 668 as performed by the deciphering mechanism or apparatus (of HDMI receiver 668)

Figure 6A:
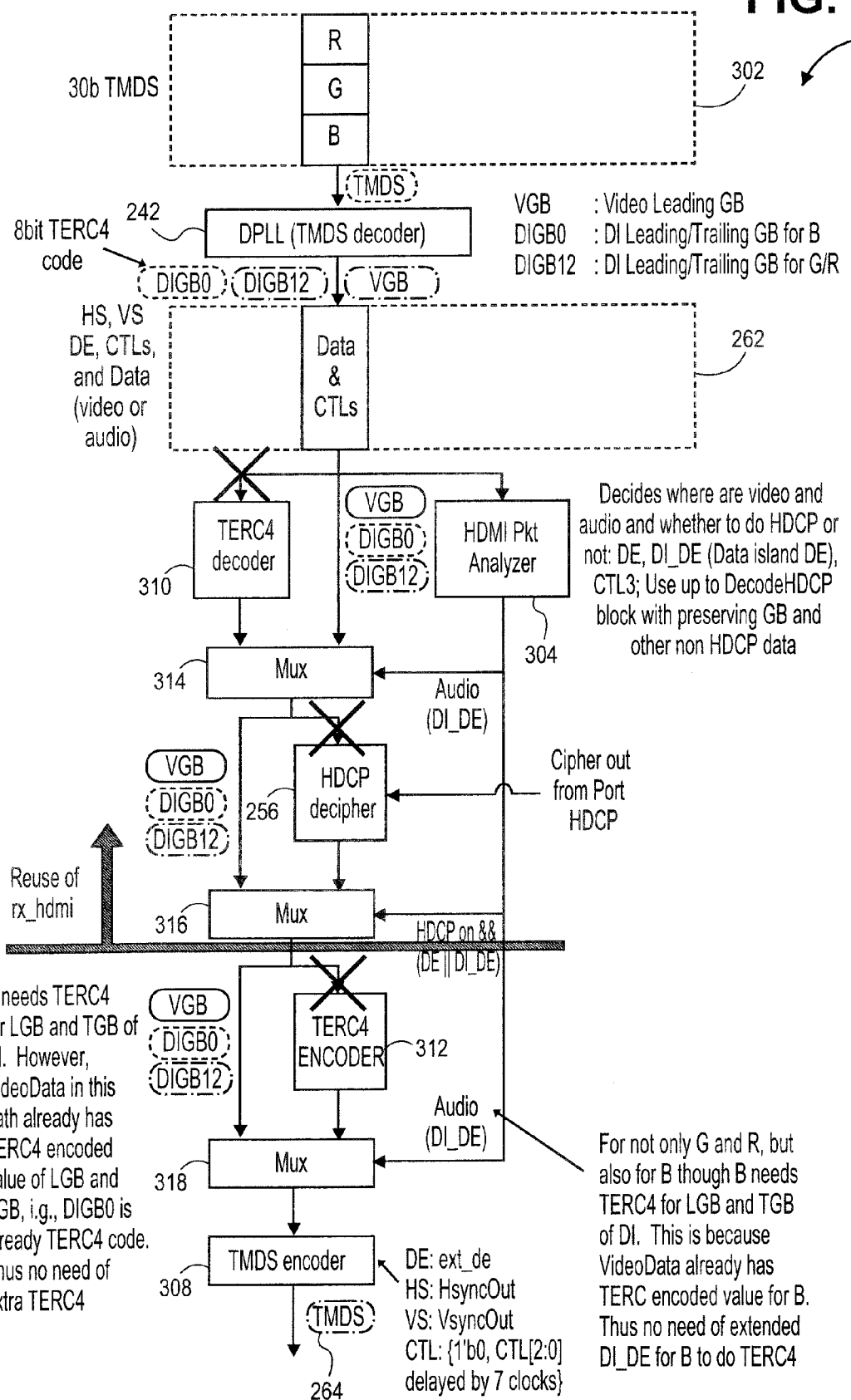
FIG. 6A illustrates an embodiment of a media content stream deciphering mechanism to process non-video/audio media contents in a audio/video media content stream.

FIG. 6A illustrates an embodiment of a media content stream deciphering mechanism 500 to process non-video/audio media contents in a audio/video media content stream. In one embodiment, using the novel content stream deciphering mechanism 500, as with the video and audio contents, the non-video/audio content (e.g., guard bands) is also protected in its original form and remains untouched during the deciphering period. Although the video and audio contents have TMDS or TMDS/TERC4 layers depending on whether they are associated with video content or audio content, they are not associated with any HDCP values and therefore, they are without an HDCP layer. In the absence of an HDCP layer, the non-video/audio contents are not deciphered and remain in their original form. Any non-video/audio contents merely pass through multiplexers 314, 316 and 318 to be part of a new HDMI audio or video media content stream 264 to be sent to an HDMI receiver to receive and broadcast the content stream 264.

FIG. 6B illustrates an embodiment of processing non-video content associated with a video media content stream. As illustrated, a media content stream 658 is received from an HDMI source 652 (e.g., transmitter), but since the non-video content 660 is without any HDMI values, the content stream 656 is processed by an HDMI receiver 654.

In one embodiment, the deciphering mechanism or apparatus is part of the HDMI receiver 654 and thus, it is contemplated that the deciphering process 650 takes place at the HDMI receiver 654 as performed by the deciphering mechanism or apparatus (of HDMI receiver 654).

FIG. 6C illustrates an embodiment of processing non-audio content associated with an audio media content stream. As illustrated, a media content stream 676 is received from an HDMI source 672 (e.g., transmitter), but since the non-audio content 660 is without any HDMI values, the content stream 676 is processed by an HDMI receiver 674.

In one embodiment, the deciphering mechanism or apparatus is part of the HDMI receiver 674 and thus, it is contemplated that the deciphering process 670 takes place at the HDMI receiver 674 as performed by the deciphering mechanism or apparatus (of HDMI receiver 674).

Figure 7:
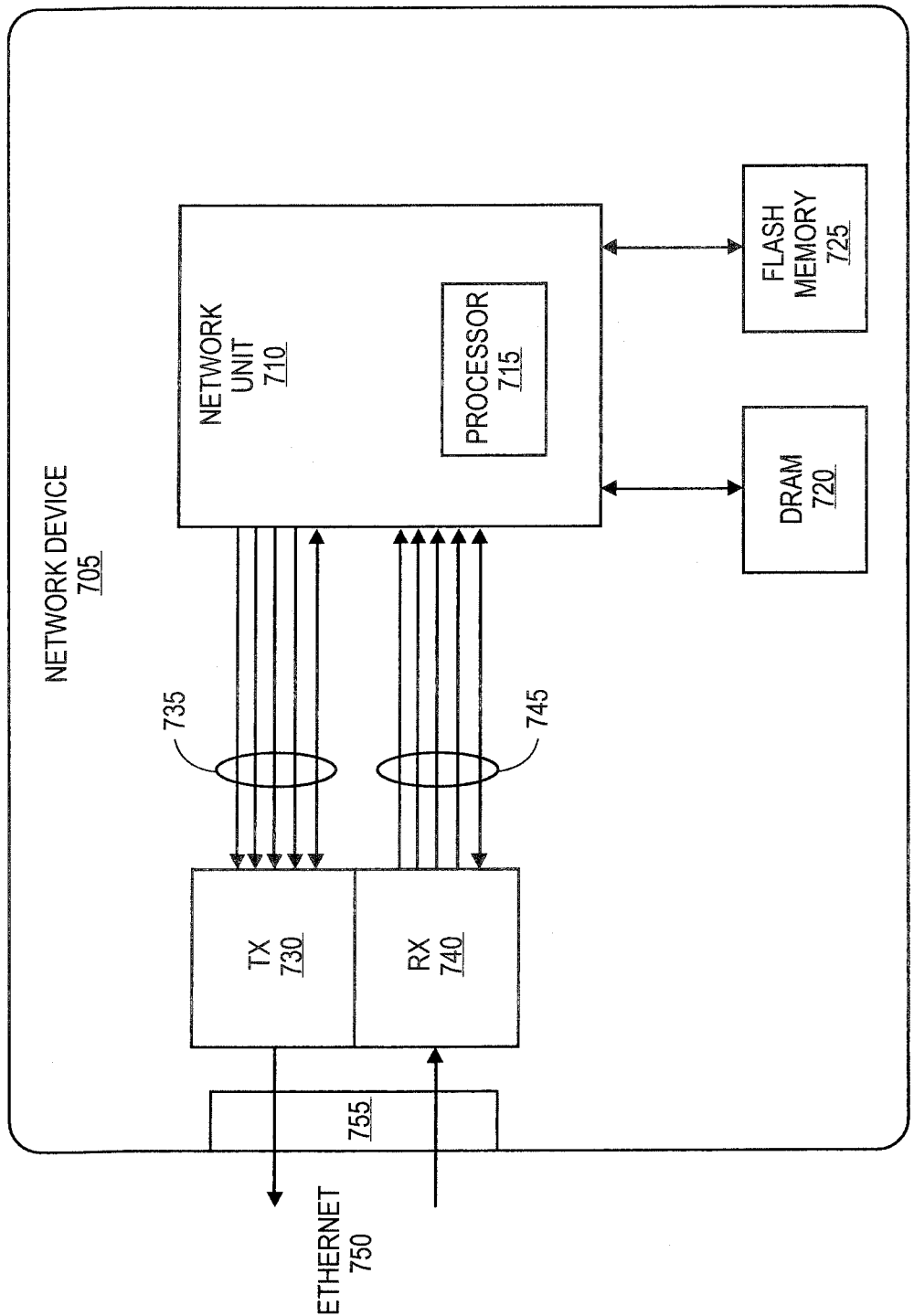
FIG. 7 is an illustration of embodiments of components of a network computer device employing an embodiment of the present invention.

FIG. 7 is an illustration of embodiments of components of a network computer device 705 employing an embodiment of the present invention. In this illustration, a network device 705 may be any device in a network, including, but not limited to, a television, a cable set-top box, a radio, a DVD player, a CD player, a smart phone, a storage unit, a game console, or other media device. In some embodiments, the network device 705 includes a network unit 710 to provide network functions. The network functions include, but are not limited to, the generation, transfer, storage, and reception of media content streams. The network unit 710 may be implemented as a single system on a chip (SoC) or as multiple components.

In some embodiments, the network unit 710 includes a processor for the processing of data. The processing of data may include the generation of media data streams, the manipulation of media data streams in transfer or storage, and the decrypting and decoding of media data streams for usage. The network device may also include memory to support network operations, such as DRAM (dynamic random access memory) 720 or other similar memory and flash memory 725 or other nonvolatile memory.

The network device 705 may also include a transmitter 730 and/or a receiver 740 for transmission of data on the network or the reception of data from the network, respectively, via one or more network interfaces 755. The transmitter 730 or receiver 740 may be connected to a wired transmission cable, including, for example, an Ethernet cable 750, a coaxial cable, or to a wireless unit. The transmitter 730 or receiver 740 may be coupled with one or more lines, such as lines 735 for data transmission and lines 745 for data reception, to the network unit 710 for data transfer and control signals. Additional connections may also be present. The network device 705 also may include numerous components for media operation of the device, which are not illustrated here.

In one embodiment, a pre-authentication system 100 having a pre-authentication device 101 of FIG. 1 employing a pre-authentication architecture (as shown in FIG. 2) and further an embodiment of a content deciphering mechanism of FIGS. 3-6B may reside in a receiver chip (e.g., switch chip) of a receiver, Rx, 740. Such a receiver 740 can be, for example, used in digital televisions for better and efficient reception of media content.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments of the present invention may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

One or more modules, components, or elements described throughout this document, such as the ones shown within or associated with an embodiment of a port multiplier enhancement mechanism may include hardware, software, and/or a combination thereof. In a case where a module includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically EPROM (EEPROM), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:
1. A method comprising:
receiving a first media content stream at a receiver device from a transmitter device coupled to the receiver device, the first media content stream having audio content formatted in a package structure, the audio content being associated with High-Definition Content Protection (HDCP) values, wherein the first media content stream includes an audio packet, an HDCP layer having the HDCP values, and one or more content layers including a Transition-Minimized Differential Signaling (TMDS) layer;

deciphering the first media content stream by removing the one or more content layers including the TMDS layer, and the HDCP layer having the HDCP values from the first media content stream while maintaining the package structure of the audio content such that the audio packet is preserved in its original format during the deciphering process; and encoding the removed one or more content layers including the TMDS layer back on the audio packet to develop a second media content stream that does not include the HDCP layer.

2. The method of claim 1, wherein the first media content stream comprises non-media content associated with the audio content, wherein the non-media content is formatted in the package structure.

3. The method of claim 1, wherein the first media content stream includes a first High-Definition Multimedia Interface (HDMI) media content stream, and wherein the second content stream includes a second HDMI media content stream, wherein the first and second media content streams comprise video content formatted in the package structure.

4. The method of claim 1, wherein the one or more content layers comprise a Transition-Minimized Differential Signaling Error Reduction Coding-4 (TERC4) layer.

5. A system comprising:
a content communication system for processing High-Definition Multimedia Interface (HDMI) data comprising a receiver device having a content deciphering mechanism being configured to:
receive a first media content stream from a transmitter device, the first media content stream having audio content formatted in a package structure, the audio content being associated with High-Definition Content Protection (HDCP) values, wherein the first media content stream incudes an audio packet, an HDCP layer having the HDCP values, and one or more content layers including a Transition-Minimized Differential Signaling (TMDS) layer;
decipher the first media content stream by removing the one or more content layers including the TMDS layer, and the HDCP layer having the HDCP values from the first media content stream while maintaining the package structure of the audio content such that the audio packet is preserved in its original format during the deciphering process; and
encode the removed one or more content layers including the TMDS layer back on the audio packet to develop a second media content stream that does not include the HDCP layer.

6. The system of claim 5, wherein the first media content stream comprises non-media content associated with the audio content, wherein the non-media content is formatted in the package structure.

7. The system of claim 5, wherein the first media content stream includes a first High-Definition Multimedia Interface (HDMI) media content stream, and wherein the second content stream includes a second HDMI media content stream, wherein the first and second media content streams comprise video content formatted in the package structure.

8. The system of claim 5, wherein the one or more content layers comprise a Transition-Minimized Differential Signaling Error Reduction Coding-4 (TERC4) layer.

9. The system of claim 5, wherein maintaining includes keeping audio and video contents within the package structure of the first and second content streams.

10. The apparatus of claim 5, wherein maintaining includes keeping audio and video contents within the package structure of the first and second content streams.

11. An apparatus comprising:
a content communication system for processing High-Definition Multimedia Interface (HDMI) data comprising a receiver device having a content deciphering mechanism having:
first logic to receive a first media content stream from a transmitter device, the first media content stream having audio content formatted in a package structure, the audio content being associated with High-Definition Content Protection (HDCP) values, wherein the first media content stream includes an audio packet, an HDCP layer having the HDCP values, and one or more content layers including a Transition-Minimized Differential Signaling (TMDS) layer;
second logic to decipher the first media content stream by removing the one or more content layers including the TMDS layer, and the HDCP layer having the HDCP values from the first media content stream while maintaining the package structure of the audio content such that the audio packet is preserved in its original format during the deciphering process;
third logic to encode the removed one or more content layers including the TMDS layer back on the audio packet to develop a second media content stream that does not include the HDCP layer.

12. The apparatus of claim 11, wherein the first media content stream comprises non-media content associated with the audio content, wherein the non-media content is formatted in the package structure.

13. The apparatus of claim 11, wherein the first media content stream includes a first High-Definition Multimedia Interface (HDMI) media content stream, and wherein the second content stream includes a second HDMI media content stream, wherein the first and second media content streams comprise video content formatted in the package structure.

14. The apparatus of claim 11, wherein the one or more content layers comprise a Transition-Minimized Differential Signaling Error Reduction Coding-4 (TERC4) layer.

15. The system of claim 11, wherein maintaining includes keeping the audio and video contents within the package structure of the first and second content streams.

16. A non-transitory machine-readable medium comprising a plurality of instructions that in response to being executed on a computing device, causes the computing device to carry out a method according to one or more operations comprising:
receiving a first media content stream from a transmitter device, the first media content stream having audio content formatted in a package structure, the audio content being associated with High-Definition Content Protection (HDCP) values, wherein the first media content stream includes an audio packet, an HDCP layer having the HDCP values, and one or more content layers including a Transition-Minimized Differential Signaling (TMDS) layer;
deciphering the first media content stream by removing the one or more content layers including the TMDS layer, and the HDCP layer having the HDCP values from the first media content stream while maintaining the package structure of the audio content such that the audio packet is preserved in its original format during the deciphering process; and encoding the removed one or more content layers including the TMDS layer back on the audio packet to develop a second media content stream that does not include the HDCP layer.

17. The non-transitory machine-readable medium of claim 16, wherein the first media content stream comprises non-media content associated with the audio content, wherein the non-media content is formatted in the package structure.

18. The non-transitory machine-readable medium of claim 16, wherein the first media content stream includes a first High-Definition Multimedia Interface (HDMI) media content stream, and wherein the second content stream includes a second HDMI media content stream, wherein the first and second media content streams comprise video content formatted in the package structure.

19. The non-transitory machine-readable medium of claim 16, wherein the one or more content layers comprise a Transition-Minimized Differential Signaling Error Reduction Coding-4 (TERC4) layer.

* * * * *